(12) United States Patent  
Yu et al.

(10) Patent No.: US 7,861,616 B2  
(45) Date of Patent: Jan. 4, 2011

(54) VEHICLE TRANSMISSION

(75) Inventors: Meng-Lin Yu, Kaohsiung (TW); Hung-Yu Su, Haohsiung (TW); Sam Huang, Kaohsiung (TW)

(73) Assignee: Kwang Yang Motor Co., Ltd., Kaohsiung (TW)

( * ) Notice: Subject to any disclaimer, the term of this patent is extended or adjusted under 35 U.S.C. 154(b) by 555 days.

(21) Appl. No.: 11/945,950

(22) Filed: Nov. 27, 2007

(65) Prior Publication Data

US 2009/0133522 A1 May 28, 2009

(51) Int. Cl.
*F16H 57/02* (2006.01)

(52) U.S. Cl. .............. 74/606 R; 180/230; 180/350

(58) Field of Classification Search .......... 74/606 R, 74/607; 180/346, 350, 356, 357, 364, 375, 180/230

See application file for complete search history.

(56) References Cited

U.S. PATENT DOCUMENTS 4,345,664 A * 8/1982 Anno et al. ............... 180/230

* cited by examiner

*Primary Examiner*—David D Le  
*Assistant Examiner*—Derek D Knight  
(74) *Attorney, Agent, or Firm*—Christensen O'Connor Johnson Kindness PLLC

(57) ABSTRACT

A vehicle transmission is adapted to transmit a power output from an engine unit to a wheel. The vehicle transmission includes a driving unit and a speed-changing unit. The driving unit includes a main box, a first driving mechanism disposed within the main box and adapted to be driven by the engine unit, and an output shaft driven by the first driving mechanism. The speed-changing unit includes an auxiliary box connected removably to the main box, a second driving mechanism disposed within the auxiliary box and driven by the output shaft, and an axle parallel to the output shaft and driven by the second driving mechanism. The axle is connected fixedly to the wheel, and extends into the auxiliary box.

5 Claims, 5 Drawing Sheets

VEHICLE TRANSMISSION

BACKGROUND OF THE INVENTION

1. Field of the Invention

This invention relates to a vehicle transmission, and more particularly to a vehicle transmission for transmitting a power output from an engine unit to a wheel.

2. Description of the Related Art

Referring to FIG. 1, a first conventional vehicle transmission 1 includes a box 11, a driving unit 12 disposed in the box 11, and a speed-changing unit 13 disposed in the box 11 and driven by the driving unit 12. The box 11 has a housing portion 111 and a cover portion 112 interconnected removably.

The driving unit 12 includes a driving pulley (not shown) disposed in an engine unit (not shown), an output shaft 120 journalled in the box 11, a driven pulley 121 sleeved fixedly on the output shaft 120, and a transmission belt 122 trained on the driving pulley and the driven pulley 121 for transmitting a power output from the engine unit to the output shaft 122.

With further reference to FIG. 2, the speed-changing unit 13 includes an axle 131 disposed parallel to the output shaft 120 and extending outwardly of the cover portion 112, a rotating shaft 132 disposed rotatably between and parallel to the output shaft 120 and the axle 131, a first gear 133 sleeved fixedly on the output shaft 120, a second gear 133' sleeved fixedly on the axle 131, a third gear 134 sleeved fixedly on the rotating shaft 132 and meshing with the first gear 133, and a fourth gear 133 formed integrally on the rotating shaft 132 and meshing with the second gear 133'. A line (L) extends through the rotating axes of the first gears 133, and is spaced apart from the rotating axis of the second gear 134.

As such, the power output of the engine unit can be transmitted to the axle 131 via a transmission line defined by the transmission belt 122, the driven pulley 121, the output shaft 120, the first gear 133, the third gear 134, the fourth gear 135, and the second gear 133'.

When it is desired to change the speed reduction ratio of the speed-changing unit 13, a fifth gear (not shown) is needed to be sleeved fixedly on the rotating shaft 132 to replace one of the third and fourth gears 134, 135 to mesh with a corresponding one of the first and second gears 133, 133'. Due to the addition of the fifth gear to the driving unit 12, it is necessary to increase the distance between the output shaft 120 and the axle 131 and, thus, the volume of the box 11. Hence, a new mold is required for manufacture of the box 11, thereby increasing the manufacturing costs of the first conventional vehicle transmission 1. Referring to FIG. 3, a second conventional vehicle transmission 2 includes a box 20, an output shaft 21, an axle 22, a rotating shaft 23 disposed at a central position 201 between the output shaft 21 and the axle 22, a first gear 24 sleeved fixedly on the output shaft 21, a second gear 25 sleeved fixedly on the axle 22, a third gear 26 sleeved fixedly on the rotating shaft 23 and meshing with the first gear 24, and a four gear 27 formed integrally on the rotating shaft 23 and meshing with the second gear 25. The rotating axes of the output shaft 21, the axle 22, and the rotating shaft 23 are aligned along a line (L'). Such an arrangement can be adjusted by moving the axle 22 and the rotating shaft 23 to the central position 201 and an upper position 202 located above the central position 201, respectively. Further rearrangement of the second conventional vehicle transmission 2, however, cannot be performed unless the size or structure of the box 11 is changed.

SUMMARY OF THE INVENTION

The object of this invention is to provide a vehicle transmission that includes a modular speed-changing unit allowing for easy replacement to thereby reduce the manufacturing costs of the vehicle transmission.

According to this invention, a vehicle transmission is adapted to transmit a power output from an engine unit to a wheel. The vehicle transmission includes a driving unit and a speed-changing unit. The driving unit includes a main box, a first driving mechanism disposed within the main box and adapted to be driven by the engine unit, and an output shaft driven by the first driving mechanism. The speed-changing unit includes an auxiliary box connected removably to the main box, a second driving mechanism disposed within the auxiliary box and driven by the output shaft, and an axle parallel to the output shaft and driven by the second driving mechanism. The axle is connected fixedly to the wheel, and extends into the auxiliary box.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
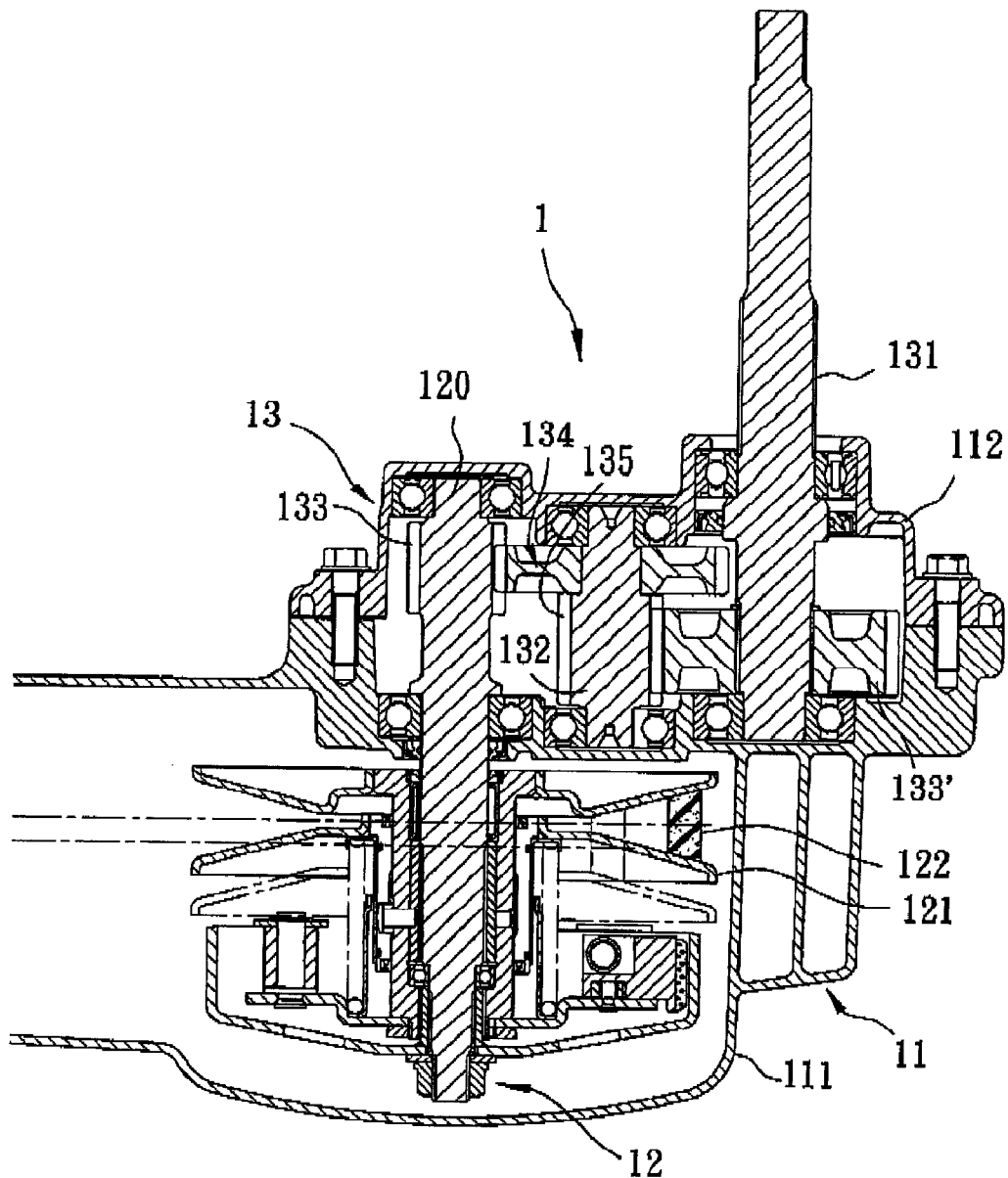
FIG. 1 is a schematic sectional view of a first conventional vehicle transmission.
Figure 2:
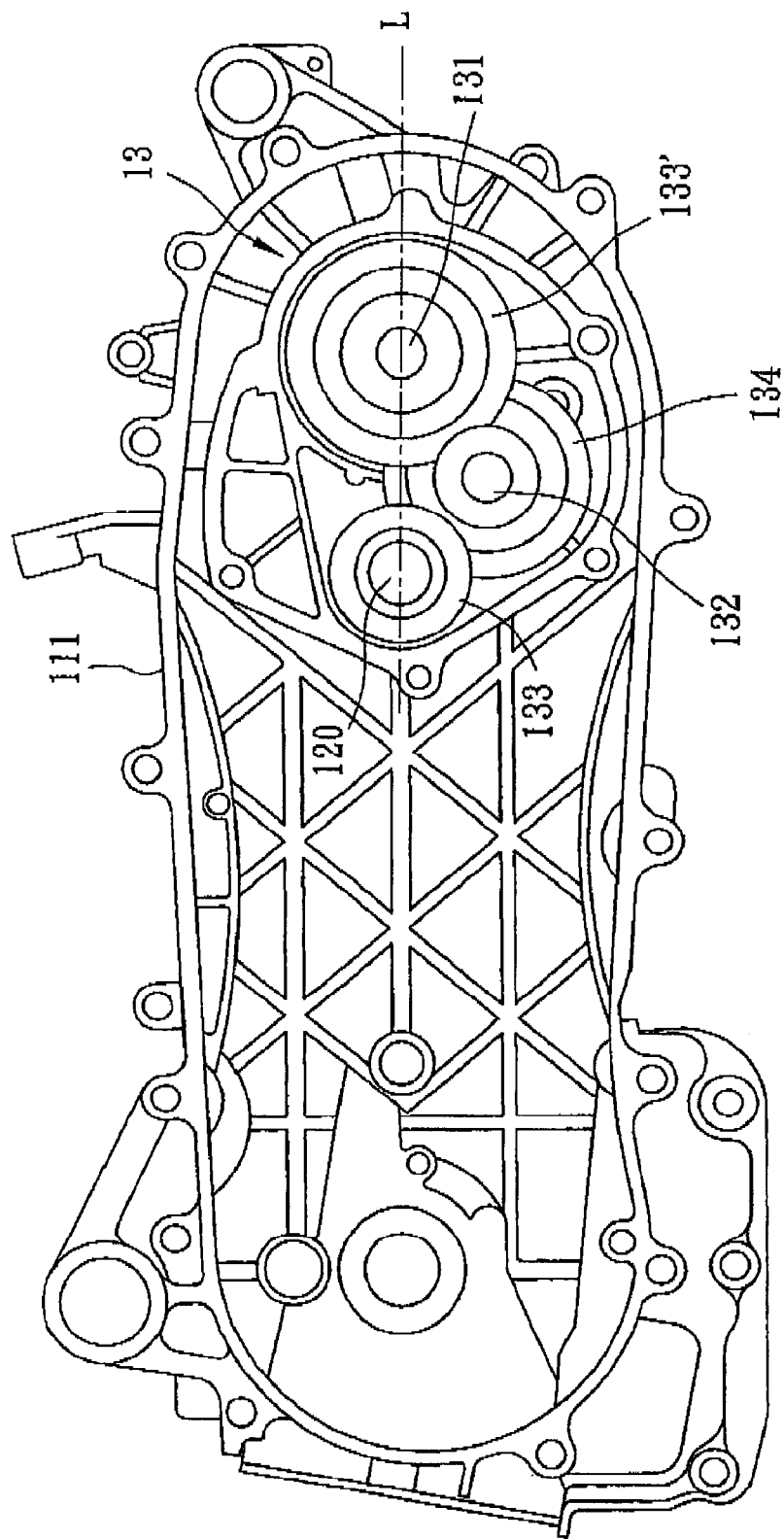
FIG. 2 is a schematic side view of the first conventional vehicle transmission.
Figure 3:
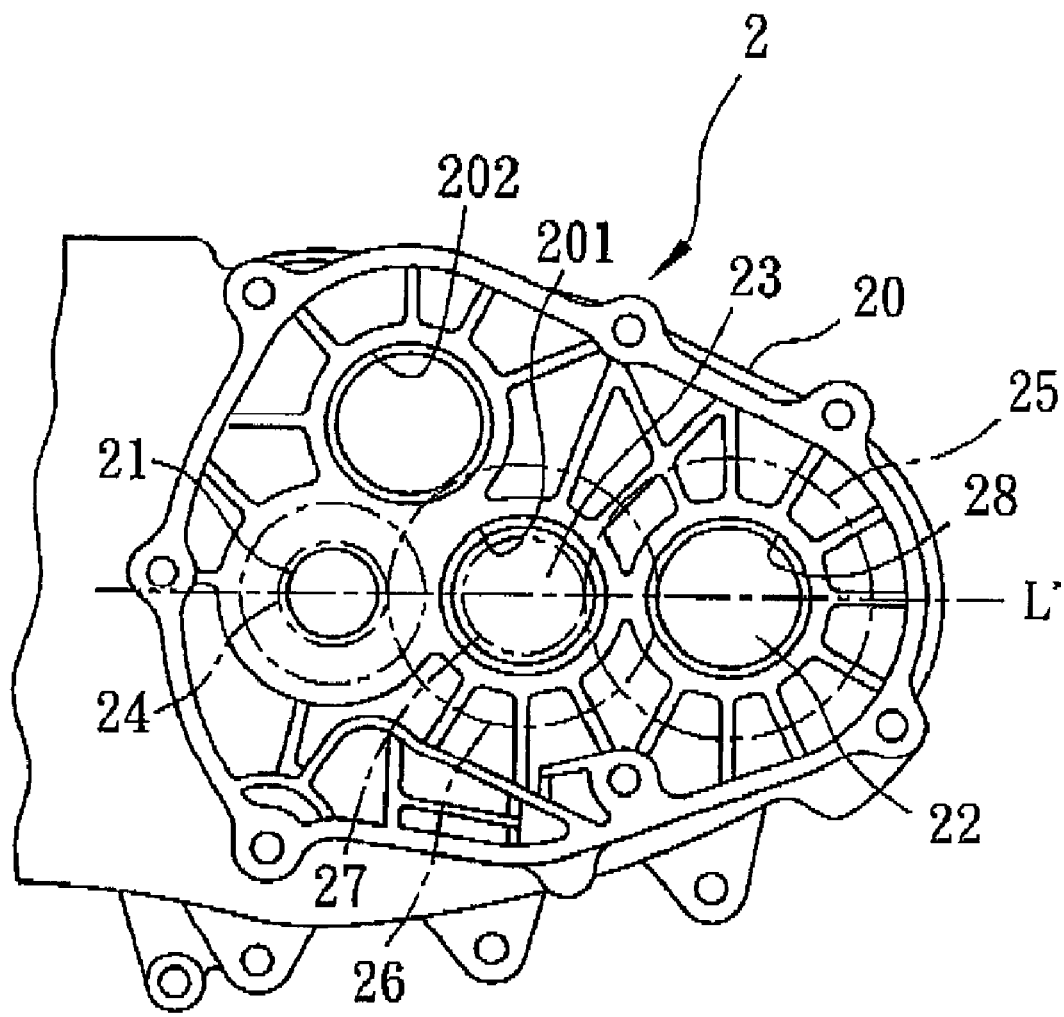
FIG. 3 is a schematic side view of a second conventional vehicle transmission.
Figure 4:
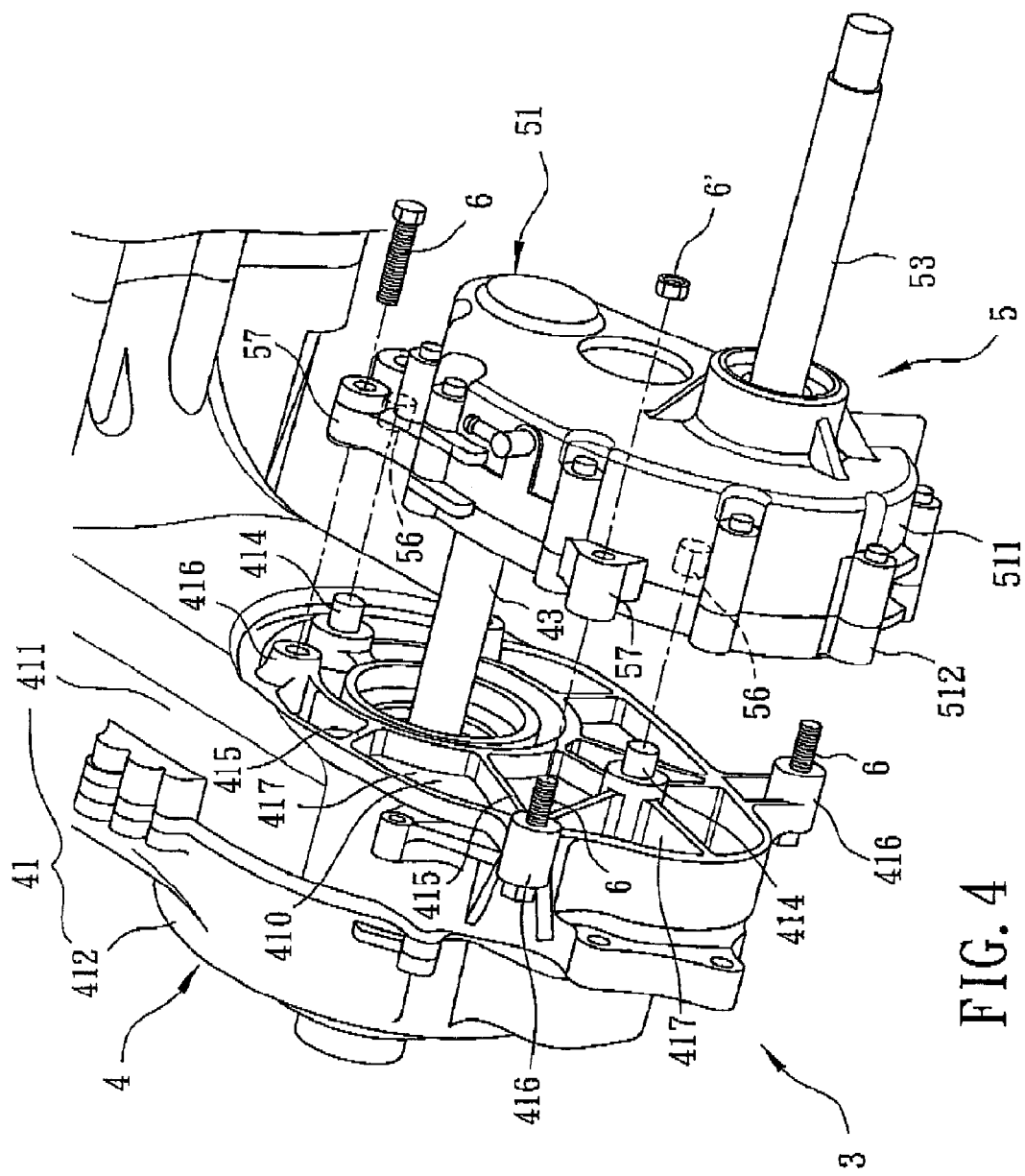
FIG. 4 is a partly exploded perspective view of the preferred embodiment of a vehicle transmission according to this invention.
Figure 5:
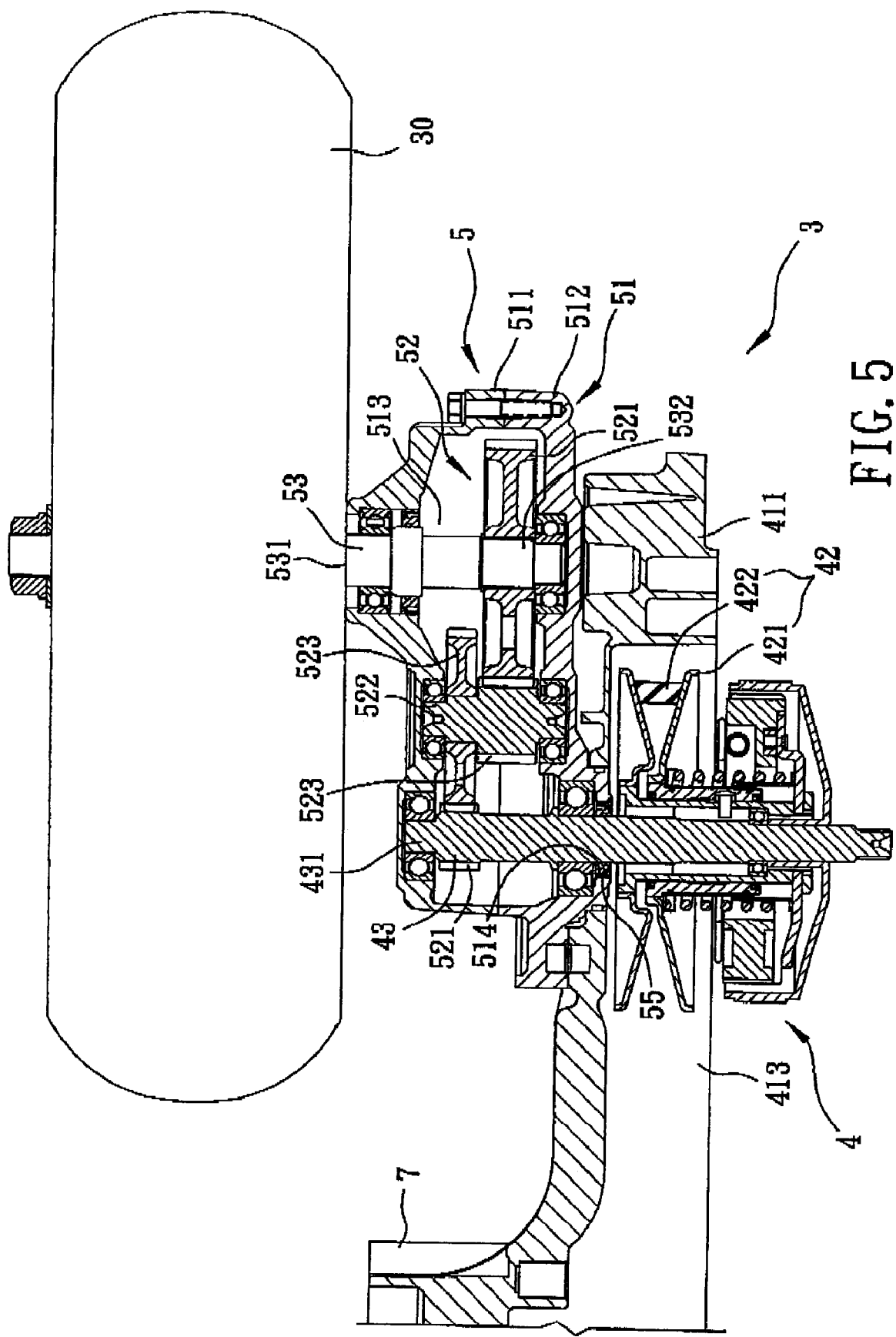
FIG. 5 is a schematic, partly sectional view of the preferred embodiment and a wheel.

Referring to FIGS. 4 and 5, the preferred embodiment of a vehicle transmission 3 according to this invention is used to transmit a power output from an engine unit 7 to a wheel 30. The vehicle transmission 3 includes a driving unit 4 and a modular speed-changing unit 5.

The driving unit 4 includes a main box 41, a first driving mechanism 42 disposed within the main box 41 and driven by the engine unit 7, and an output shaft 43 driven by the first driving mechanism 42. The main box 41 has a main housing portion 411 and a main cover portion 412 interconnected removably to define a first receiving space 413 allowing for mounting of the first driving mechanism 42 therewithin. The output shaft 43 extends through the main housing portion 411.

The speed-changing unit 5 includes an auxiliary box 51 connected removably to the main box 41, a second driving mechanism 52 disposed within the auxiliary box 51 and driven by the output shaft 43, and an axle 53 parallel to the output shaft 43. The axle 53 has a first end 531 connected fixedly to the wheel 30, and a second end 532 opposite to the first end 531 and extending into the auxiliary box 51. The auxiliary box 51 has an auxiliary housing portion 511 and an auxiliary cover portion 512 interconnected removably to define a second receiving space 513 allowing for mounting of the second driving mechanism 52 therewithin. The auxiliary housing portion 511 covers an end 431 of the output shaft 43. The auxiliary cover portion 512 is connected removably to the main housing portion 411, and allows for extension of the axle 53 therethrough.

The auxiliary cover portion 512 is formed with a through hole 514 allowing for extension of the output shaft 43 therethrough. The speed-changing unit 5 further includes an annular seal 55 sleeved on the output shaft 43 and closing the through hole 514.

The second driving mechanism 52 of the speed-changing unit 5 includes two first gears 521 sleeved respectively and fixedly on the output shaft 43 and the axle 53, a rotating shaft 522 disposed rotatably between and parallel to the output shaft 43 and the axle 53, two second gears 523 disposed on the rotating shaft 522 and meshing respectively with the first gears 521 for transferring rotation of the output shaft 43 to the axle 53. One of the second gears 523 is sleeved fixedly on the rotating shaft 522, and the other of the second gears 523 is formed integrally on the rotating shaft 522.

The main box 41 has an engagement surface 410 facing the auxiliary cover portion 513 of the auxiliary box 51 and formed with a plurality of positioning pins 414, a plurality of interconnected ribs 415, a plurality of sleeves 416, and a plurality of recesses 417 defined by the ribs 415. The auxiliary box 51 is formed with a plurality of positioning holes 56 engaging respectively the positioning pins 414 to thereby position the main and auxiliary boxes 41, 51 relative to each other, and a plurality of sleeves 57 aligned respectively with the sleeves 416. The vehicle transmission 3 further includes a plurality of bolts 6, each of which extends through a respective one of the sleeves 416 of the main box 41 and a respective one of the sleeves 57 of the auxiliary box 51. The bolts 6 engage respectively a plurality of nuts 6' (only one is shown in FIG. 4) to interconnect the main an auxiliary boxes 41, 51 fixedly.

Alternatively, the positions of each interconnected pair of the positioning pin 414 and the positioning hole 56 may be interchanged.

In view of the above, the vehicle transmission 3 of this invention has the following advantages:

(1) Since the speed-changing unit 5 is modular, it can be replaced with ease. The auxiliary box 51 of the speed-changing unit 5 is connected removably to the main box 41, and receives the second driving mechanism 52 and the axle 53 therewithin. As a consequence, when it is desired to change the distance between the front and rear wheels 30 of the vehicle mounted with the vehicle transmission 3 or the speed reduction ratio of the speed-changing unit 5, the speed-changing unit 5 can be replaced easily with a new one including the second driving mechanism 52 of a desired different arrangement.

(2) Since the driving unit 4 is suitable for the speed-changing units 5 having the second driving mechanisms 52 of different arrangements, the vehicle transmission 3 can be made at a low cost.

(3) Due to engagement between the positioning pins 414 and the positioning holes 56, the speed-changing unit 5 can be mounted easily to the driving unit 4.

(4) The weight of the driving unit 4 is reduced as a result of the recesses 417. Furthermore, the structural strength of the driving unit 4 is maintained at an acceptable level as a result of the ribs 415.

(5) Lubricating oil is typically applied to facilitate rotation of the first and second gears 521, 523, and the annular seal 55 serves as an oil seal for preventing flow of the lubricating oil from the auxiliary box 51 into the main box 41.

With this invention thus explained, it is apparent that numerous modifications and variations can be made without departing from the scope and spirit of this invention. It is therefore intended that this invention be limited only as indicated by the appended claims.

We claim:

1. A vehicle transmission adapted to transmit a power output from an engine unit to a wheel, said vehicle transmission comprising:
   a driving unit including a main box, a first driving mechanism disposed within said main box and adapted to be driven by the engine unit, and an output shaft driven by said first driving mechanism; and
   a speed-changing unit including an auxiliary box connected removably to said main box and covering an end of said output shaft, a second driving mechanism disposed within said auxiliary box and driven by said output shaft, and an axle parallel to said output shaft and having a first end adapted to be connected fixedly to the wheel, and a second end opposite to said first end and extending into said auxiliary box, said axle being driven by said second driving mechanism, wherein:
      said main box of said driving unit has a main housing portion and a main cover portion interconnected removably to define a first receiving space allowing for mounting of said first driving mechanism therewithin, said output shaft extending through said main housing portion; and
      said auxiliary box of said speed-changing unit has an auxiliary housing portion and an auxiliary cover portion interconnected removably to define a second receiving space allowing for mounting of said second driving mechanism therewithin, said auxiliary cover portion being connected removably to said main housing portion and allowing for extension of said output shaft therethrough, said auxiliary housing portion covering said end of said output shaft and allowing for extension of said axle therethrough; and
   wherein one of said main and auxiliary boxes is formed with a plurality of positioning holes, and the other of said main and auxiliary boxes is formed with a plurality of positioning pins engaging said positioning holes, respectively, to position said main and auxiliary boxes relative to each other.

2. The vehicle transmission as claimed in claim 1, wherein each of said main and auxiliary boxes is formed with a plurality of sleeves, said sleeves of said main box being aligned respectively with said sleeves of said auxiliary box, said vehicle transmission further comprising a plurality of bolts each extending through a respective one of said sleeves of said main box and a respective one of said sleeves of said auxiliary box, and a plurality of nuts engaging respectively said bolts to interconnect said main and auxiliary boxes fixedly.

3. The vehicle transmission as claimed in claim 1, wherein said main housing portion of said main box has an engagement surface facing said auxiliary cover portion of said auxiliary box and formed with a plurality of interconnected ribs defining a plurality of recesses.

4. The vehicle transmission as claimed in claim 1, wherein said auxiliary cover portion of said auxiliary box is formed with a through hole allowing for extension of said output shaft therethrough, said speed-changing unit further including an annular seal sleeved on said output shaft and closing said through hole in said auxiliary cover portion.

5. The vehicle transmission as claimed in claim 1, wherein said second driving mechanism of said speed-changing unit includes:
   two first gears sleeved respectively and fixedly on said output shaft and said axle;
   a rotating shaft disposed rotatably between and parallel to said output shaft and said axle; and
   two second gears disposed on said rotating shaft and meshing respectively with said first gears for transferring rotation of said output shaft to said axle.

* * * * *